United States Patent [19]
de Carbon

[11] 3,883,152
[45] May 13, 1975

[54] WHEEL SUSPENSIONS

[76] Inventor: Christian Bourcier de Carbon, 64, Boulevard Maurice-Barres, 92-Neuilly-sur-Seine, France

[22] Filed: Feb. 12, 1971

[21] Appl. No.: 115,032

[52] U.S. Cl. .......................................... 280/96.2 R
[51] Int. Cl. ............................................ B62d 7/06
[58] Field of Search ........................ 280/96.2, 96.1

[56] References Cited
UNITED STATES PATENTS

| | | | |
|---|---|---|---|
| 723,975 | 3/1903 | Ball, Jr. .......................... | 280/96.1 X |
| 1,316,565 | 9/1919 | Ewing ............................ | 280/96.2 R |
| 2,245,809 | 6/1941 | Olley ............................. | 280/96.1 X |
| 2,297,591 | 9/1942 | Urich ............................ | 280/96.2 R X |
| 2,674,450 | 4/1954 | Frank ............................ | 280/96.2 R X |
| 2,845,279 | 7/1958 | Polhemus et al. ............... | 280/96.2 R |
| 2,965,185 | 12/1960 | Marchetti ...................... | 280/106.5 R |
| 3,034,802 | 5/1962 | Axtmann ....................... | 280/96.2 R |
| 3,414,287 | 12/1968 | Weiertz ......................... | 280/96.2 R |
| 3,462,168 | 8/1969 | Gebler .......................... | 280/96.2 R |

OTHER PUBLICATIONS
Automotive Service Digest, "Handbook of Front End Adjustment", August 1953, pp. 83–90.
Front Suspension–Analytically Speaking, Received 4/15/61 pp. 3, 4 and 11.

*Primary Examiner*—David Schonberg
*Assistant Examiner*—John P. Silverstrim
*Attorney, Agent, or Firm*—Watson, Cole, Grindle & Watson

[57] ABSTRACT

The pivot axis of the lower one of a pair of superposed connections between a wheel mounting of a motor vehicle it tilted downwardly and rearwardly, and the upper one either tilted in the same direction or located rearwardly of the lower one, causing the wheel mounting to oscillate in a path inclined upwardly and rearwardly with respect to the direction of movement of the vehicle. The angles of inclination and tilt may vary from 10° to 30°. The upper and lower connections may be cross arms, for example, of the wishbone type, or leaf springs, and in certain cases, the upper connection may be by way of a resilient extensible strut.

11 Claims, 6 Drawing Figures

WHEEL SUSPENSIONS

The present invention relates to an improvement in the suspension of autovehicles.

Figure 1:
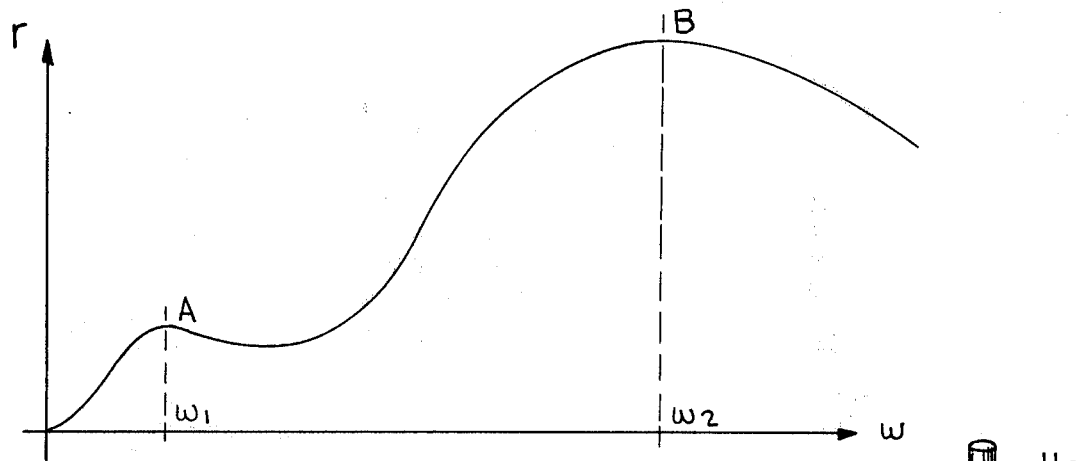

In the field of elastic suspension of vehicles and its damping, it has been shown by a mathematical study by the applicant that vertical accelerations transmitted to the chassis in response to the excitations of the road had the shape depicted in FIG. 1 of the drawings depending on the frequency of the stress, assuming the amplitude of the undulations of the road to be constant.

In this diagram, frequency $\omega_1$ designates the resonant frequency of the chassis of the vehicle to which a maximum A of acceleration corresponds. The value of acceleration A can be reduced by making the suspension of the vehicle more supple.

Frequency $\omega_2$ corresponds to the resonant frequency of the tire which is associated with a maximum B of the acceleration transmitted to the chassis which is 3 to 4 times greater than maximum A. Since in practice it is not possible to affect the elasticity of present tires, one of the hardest problems in the matter of suspension is to obtain an improvement in this frequency. A possible improvement in regard to the passenger is obviously to provide soft cushions for the seats. But considerable accelerations in the vicinity of point B are still transmitted to the chassis and constitute a cause of fatigue for this latter.

A solution in principle to reduce accelerations B to frequency $\omega_2$ lies in the use of damped beaters associated with the wheels, but these beaters are heavy and cumbersome and increase the cost of the vehicle. For this reason, automobile designers are reluctant to use them.

The present invention has for its purpose the presenting of a novel solution to solve this basic problem. It consists in an arrangement of the suspension of the wheels of an autovehicle, characterized by the fact that the wheels are suspended so as to describe a path of movement inclined backward in relation to the forward movement of the vehicle, the inclination preferably being greater than 10° and even 15°. In other words, in an ascending movement, the wheel moves back in relation to the chassis, while it advances in a descending movement. It should be noted that the arrangement of the suspension of the wheels of the autovehicle according to the invention comprises a degree of effectiveness which increases with the inclination of the path of the wheel and angle of inclination indicated above constitutes a lower limit for the effect to be noticeable. To obtain optimal use of the present invention, it will generally be preferable to use an angle of travel considerably greater, for example, of the order of 20° to 30°.

A complete mathematical theory of the suspension and movement of the wheel shows that the novel arrangement has a basic result of considerably lowering the maximum relative to point B, which results in a considerable increase in riding comfort. The theory further shows that the variations of the pressure of the tires on the ground are also reduced, which results in an improvement of adherence, therefore safety. These two remarks are enough to show the considerable merit of the present invention.

It should be noted that the front telescopic forks of motorcycles are generally inclined backward for reasons relating to the geometry of direction pertaining to the two wheels and to achieve a relatively short frame in relation to the wheel base. Although with this arrangement the effect mentioned is already obtained but without knowing it and without having sought it, a similar arrangement on an autovehicle has never been provided. This is due to the fact that it had not been understood that the front telescopic suspension of motorcycles attains a particular effect and that, on the other hand, it is not possible to use a telescopic fork suspension on an automobile.

In the development of the general inventive idea, it can be provided by application to various types of suspension:

that in the case of a wheel suspension with two superposed oscillating crossarms, the axes of oscillation are inclined so as to assure the wheel a path of movement inclined backward more than 10° or even 15°;

that in the case of a wheel suspension with two superposed oscillating crossarms, the axis of oscillation of at least one of the two crossarms is inclined at least 15° or 20° so as to assure the wheel a path inclined backward more than 10° or even 15°;

That in the case of a wheel suspension with two superposed oscillating crossarms, the two axes of oscillation of the two crossarms are inclined so as to incline at least 10° the backward travel of the wheel, the inclination of the upper arm being increased at least 5° to 10° to prevent the vehicle from plunging forward upon braking;

that in the case of a wheel suspension comprising as an elastic and guide element one or more crosswise leaf springs, possibly with two spaced points of anchoring to the chassis, the plane of deformation of one at least of said springs being inclined backward at a certain degree at least equal to 10° or even 15°;

that in the case of a wheel suspension with lengthwise leaf springs, the front and back anchoring points of the ends of said springs are provided at different levels to give a path of the inclined wheel backward of at least 10°;

that in the case of a suspension with draft or thrust arms or the combination of the two, the inclination of said arms under full load is equal to or greater than 10° or 15° so as to assure the path of the wheel a backward inclination;

that in the case of a suspension with an elastic brace that is solid by its upper end with the chassis and connected by the lower end on an oscillating crossarm or triangulation, the axis of oscillation of said crossarm or triangulation is inclined so as to assure the wheel a path inclined backward of at least 10° or 15°;

that the plane of deformatioon of a crosswise blade spring is inclined backward at a certain angle at least equal to 10° or even 15° in the case of a telescopic brace suspension that is solid by its upper end to the chassis and connected by its lower end on said crosswise leaf spring, possibly attached to the chassis by two spaced anchoring points and possibly associated with an oblique rod thus constituting a triangulation;

that one (or two) oscillating crossarms with an inclined axis is replaced by a leaf spring whose plane of deformation is inclined at the angle indicated;

that in the case of a wheel suspension with an elastic or telescopic brace, said brace is inclined upward toward the back at an angle $\gamma$ of more than 10° or even 15°;

that the connection of the oscillating crossarm or triangulation with the elastic or telescopic brace is displaced toward the back a certain distance in relation to the axis of said elastic or telescopic brace;

that the stub axle of the wheel is staggered forward a certain distance in relation to the axis of the elastic or telescopic brace;

that the elastic or telescopic brace is extended lower than the stub axle of the wheel, particularly in the case of a front drive vehicle.

Figure 6:
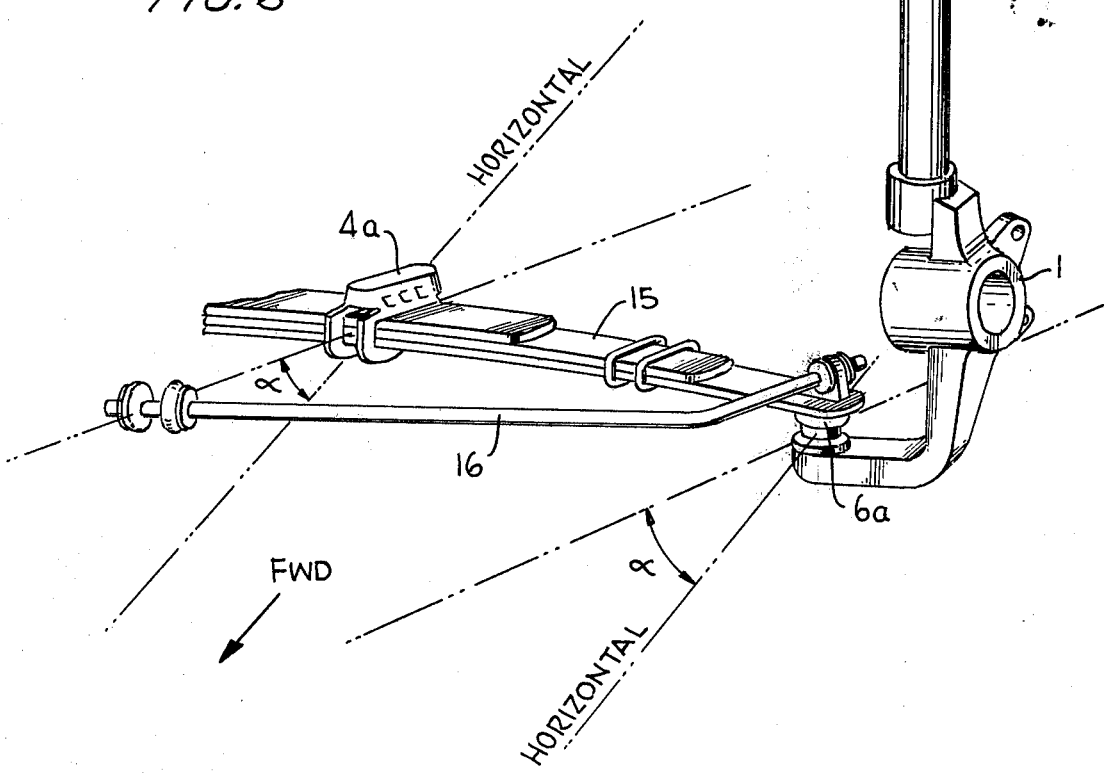
Figure 2:
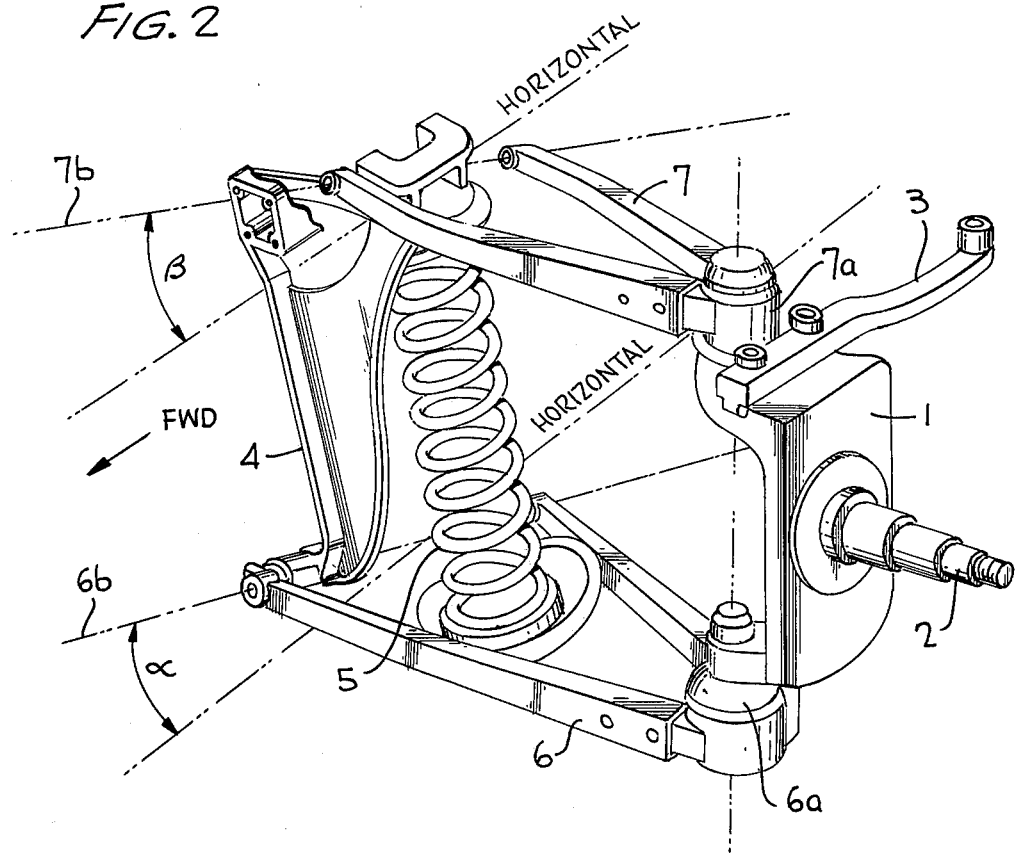
Figure 3:
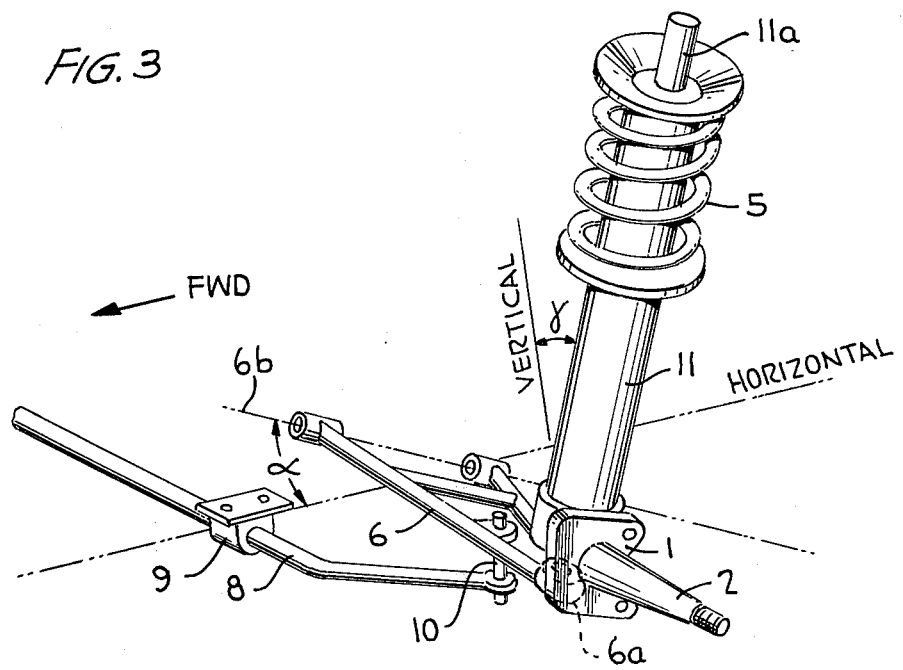
Figure 4:
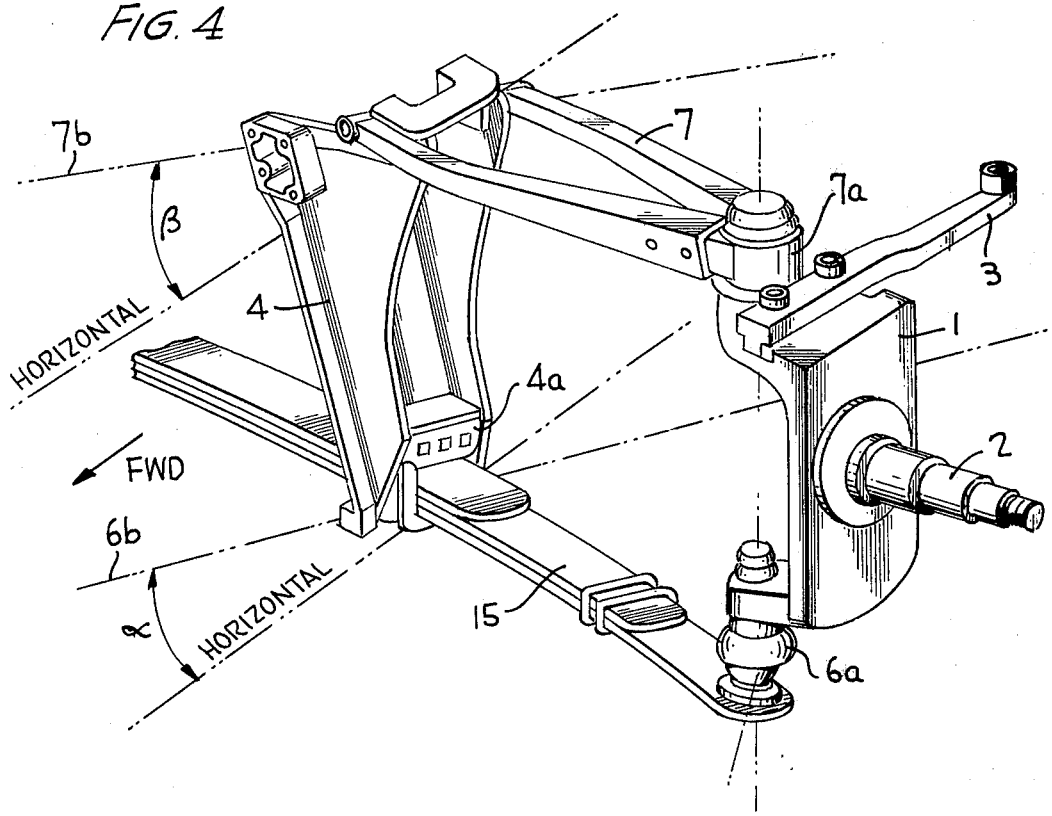
Figure 5:
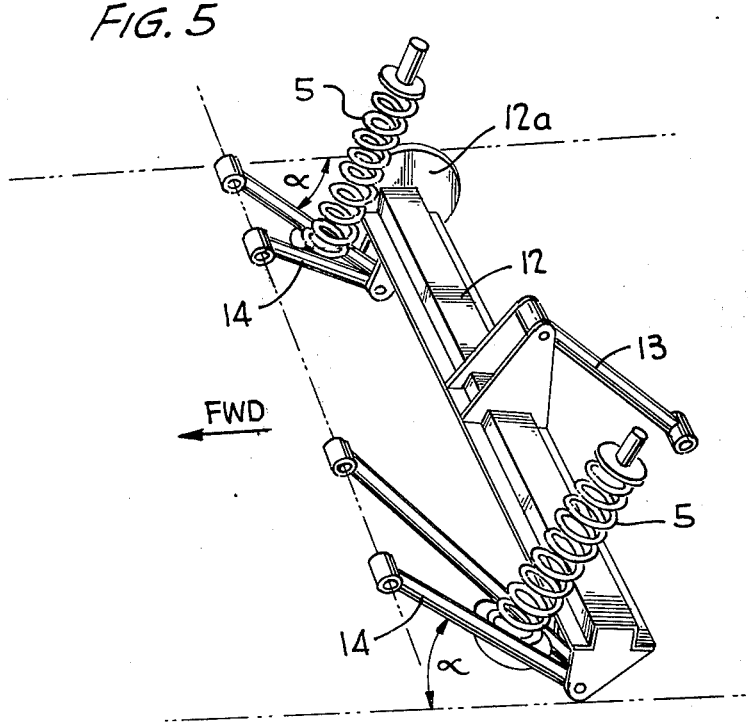

By way of non-limiting example and to facilitate understanding of the following description, there has been represented in the accompanying drawings:

FIG. 1 a diagram explanatory of the vertical accelerations transmitted to the chassis;

FIG. 2 a schematic view in perspective of a front wheel suspension of a vehicle by means of two superposed crossarms with inclination of the axes of oscillation according to the invention;

FIG. 3 a schematic view in perspective of a wheel suspension of the elastic brace type with inclination of the axis of inclination of the crossarm according to the invention;

FIG. 4 is a schematic view in perspective of a wheel suspension comprising as an elastic and guide element a leaf spring crosswise to the plane of deformation inclined according to the invention;

FIG. 5 a schematic view in perspective of a back wheel suspension with a rigid axle with a combination of drawn and thrust rods as guide elements inclined according to the invention; and FIG. 6 a schematic view in perspective of a wheel suspension with a telescopic brace and comprising as the elastic and guide element a leaf spring crosswise to the plane of deformation inclined according to the invention.

Referring first to FIG. 2, it can be seen that the suspension is made up of a stub axle support 1 with the stub axle 2 provided with a lever 3 for direction. Crosswise triangular arms 6, 7 are connected, on the one hand, to stub axle support 1 by swivel joints 6a, 7a, and, on the other hand, on the chassis by means of suspension support 4 which also receives the reaction of spring 5. The axis of connection 6b of the lower arm 6 is inclined backward a certain angle $\alpha$, while axis of connection 7b of the upper arm 7 is inclined backward by angle $\beta$ at least equal to angle $\alpha$ and preferably 10° or 15° greater.

In the case of FIG. 3 showing an elastic brace suspension made up of stub axle 2 solid with its support 1 which is an integral part of telescopic guide element 11, crossarm 6 alone governs the path of stub axle 2 by inclining the axis of inclination 6b of arm 6 by required angle $\alpha$. The telscopic element which in general is a hydraulic shock absorber is attached to the chassis by an elastic swivel joint device, not shown, around pin 11a and spring 5 supports the weight of the vehicle. An anti-roll bar 8 can be provided, attached, on the one hand, to arm 6 by rod 10 and connected to the chassis, on the other hand, in elastic support 9.

It should be noted that in principle the telescopic element can have any inclination in relation to arm 6, the path of the stub axle 2 being in practice determined solely by the inclination of the axis of connection 6b of said arm 6. However, in the case where this suspension is provided for directing wheels, it is preferably to give element 11 a certain backward inclination $\gamma$, as shown in FIG. 3, while displacing, back of element 11, connection 6a of arm 6 to obtain by this arrangement an action opposing the forward depression of the vehicle during braking. Such an arrangement further presents the advantage of being very effective against the shimmy of the front wheels, as appears from a thorough study of this question in a work of the applicant published in 1948 by the National Office for Aeronautical Studies and Research under the title "Theoretical Study of the Shimmy of Aircraft Wheels".

This latter combination described is particularly desirable because the inclined wheel recoil movement according to the basic idea of the invention is accompanied by a certain tendency to compression at the time of braking, if this tendency is not corrected by a secondary arrangement. To obtain a perfect correction of this tendency to compression at the time of braking, it will be of interest to give to element 11 an inclination $\gamma$ greater than that of $\alpha$ of the axis of connection 6b or arm 6.

It should be noted that the arrangement that has just been mentioned remains valid with its independent advantages regardless of the inclination of the path of the wheel movement. It should also be noted that with this arrangement, if the axis of element 11 is inclined sufficiently, it is advantageous to displace, in front of this element, stub axle 2 to maintain a normal value for the caster. (Let us recall that the caster is the distance between the center of the surface of contact of the tire with the ground and the point of intersection with the ground of the axis of rotation of the plan of the wheel for the direction of the vehicle).

Consequently, even in the case of a vehicle with front wheel drive, it is possible to use elastic rods of great length, since the axis of the stub axle then passing in front of element 11, the body of this element 11, can then be extended down more than the axis of stub axle 2, which presents the great advantage of having widely spaced guide rings in element 11.

In FIG. 4 is shown a suspension embodiment comprising as the lower guide and elastic element a leaf spring 15 solid with suspension support 4 and, therefore, with the chassis by clamp 4a, and by a second symmetrical clamp not shown. The stub axle support 1 with stub axle 2 is connected, on the one hand, to spring 15 by connection 6a and to suspension support 4 by arm 7 by means of swivel joint 7a. The plane of deformation of spring 15 and the axis of connection of arm 7 are inclined according to the invention at certain angles $\alpha$ and $\beta$ for assuring the wheel a path of inclined movement backwards according to the invention.

As in the case of FIG. 2 it is possible to provide that the inclination of arm 7 is greater than that of spring 15 to compensate for the braking forces.

It is obvious that a suspension with two superposed cross springs obtains the same effects according to the invention by inclining at least one of the springs so as to obtain a backward inclined path of the wheel. In all that has been said, each time an oscillating arm with an inclined connection axis could be replaced by a leaf spring whose plane of deformation would be inclined in relation to the vertical direction.

It should be noted that because of the attachment of spring 15 by two spaced clamps, the spring acts like an antiroll bar by relieving the inside wheel when the vehicle turns.

The invention also applies to suspension arrangements comprising draft or thrust rods or their combination. An example is shown in FIG. 5. It involves a rigid axle for the back wheels of a front wheel drive vehicle. Axle 12 is made up of a section of steel plate provided on its end with brakes 12a, etc. The connection to the chassis is assured by two draft arms 14 inclined according to the invention at angle α and by a thrust arm 13 connected to the middle of axle 12 also inclined at angle α.

In the case of the rigid back axle, the arrangement according to FIG. 5 gives a directing action to this axle, which is known in itself. Now, particularly, on a front wheel drive vehicle this action is favorable since it has a tendency to attenuate its behavior when turning, the effect diminishing with the increase of the load as is often desirable with this type of vehicle. But in any case, it is always possible to find a suspension geometry which prevents or reduces this rolling action while making it possible to obtain a backward inclined plane of at least 10° for simultaneous recoil movements of the two wheels of the same axle.

In FIG. 6 is shown a telescopic rod suspension 11 connected at 11a on the chassis of the vehicle. By adopting as the elastic connecting and guide element a lower cross spring 15 connected by swivel joint 6a to stub axle support 1, a particularly simple embodiment of a wheel suspension is obtained. Said cross spring 15 is obviously inclined at angle α to give the wheel the backward inclined path according to the invention. If it is desired to give the anti-roll bar action, it suffices to provide, as in FIG. 4, a clamp 4a and another symmetrical one for spring 15 on the chassis. To increase the lengthwise rigidity of the mounting by a triangulation it is possible to provide for the mounting of an oblique thrust rod 16 between the end of spring 15, close to swivel joint 6a and the chassis.

It is obvious that the invention is not limited to the examples described.

Actually, in the case of a suspension of wheels by independent draft rods, the inclination according to the invention of at least 10° should be obtained under full load in the way described. Also, the combination of a triangular cross arm for lower connection of the stub axle support to the chassis with an upper thrust arm with inclination of the upper arm and/or of the lower arm is within the invention. A simple solution for rigid axle guides by lengthwise leaf springs consists in providing front and back clamps for the springs of different height so that the wheel movement takes the desired backward inclination. It should further be noted that vehicles equipped with an automatic stabilizing compensation lend themselves particularly well to the application of the suspension arrangement according to the invention, since in the case of draft or thrust arms for the suspension of the wheels, their inclination is independent of the load.

What is claimed is:

1. A suspension device for automotive vehicle wheels, comprising a wheel mounting, including the wheel spindle, having upper and lower supporting connections with the chassis of the vehicle, said lower connection comprising a member extending transversely outwardly with respect to the chassis, means connecting an inward portion of said connection with said chassis for approximately up and down movement flexing with relation to the chassis, the axis of said flexing movement inclined downwardly and rearwardly with respect to the direction of movement of the vehicle; said upper connection comprising means for hingedly connecting the upper portion of the wheel mounting to the chassis sufficiently rearwardly of the wheel spindle and of the lower connection that, together with the inclination of the lower connection, the path of oscillatory movement of the spindle is inclined rearwardly with regard to the direction of movement of the vehicle, the angle of inclination being a minimum of from about 10° to about 30°; said device including spring means for resilient suspension of the vehicle from the wheels.

2. A suspension device as set forth in claim 1, in which the spring means comprises an extensible resilient strut pivotally secured at its lower end to the lower portion of the wheel mounting and at its upper end to the chassis, this latter securement constituting the said upper connection of the device.

3. The device as set forth in claim 2, in which the securement of the strut to the wheel mounting is at a point lower than the wheel spindle.

4. The device as set forth in claim 2, in which the lower connection comprises a cross arm having an inclined pivotal connection at its inward end with the chassis.

5. The device as set forth in claim 4, in which the attachment of the wheel mounting to the lower cross arm is displaced rearwardly of the strut.

6. The device as set forth in claim 2, in which the lower connection comprises a leaf spring the hinging connection of its inward end to the chassis confinning the angle of flexing of the spring to a rearward and downward angularity.

7. The device as set forth in claim 2, in which the securement of the strut to the chassis is such that, at all times, the angle of rearward inclination of the strut to the vertical is somewhat greater than the downward inclination of the lower connection to the horizontal.

8. The device as set forth in claim 2, in which the wheel spindle is displaced forwardly of the said strut.

9. The device as set forth in claim 1, in which both the upper and lower connections comprise laterally outwardly extending cross arms having pivotal securement to upper and lower portions of the chassis, the axis of both pivots being rearwardly and downwardly inclined to the horizontal.

10. The device as set forth in claim 9, in which the angle of the pivotal axis of the upper cross arm is from 5° to 10° greater than that of the lower one.

11. The device as set forth in claim 1, in which one of said connections comprises a cross arm and the other a leaf spring.

* * * * *